United States Patent
Hewitt

(10) Patent No.: US 11,132,675 B2
(45) Date of Patent: Sep. 28, 2021

(54) MULTI-SCHEME PAYMENT INTEGRATED CIRCUIT CARD, PAYMENT SYSTEM, AND PAYMENT METHOD

(71) Applicant: SCRAMCARD HOLDINGS (HONG KONG) LIMITED, Queensland (AU)

(72) Inventor: Simon Hewitt, Queensland (AU)

(73) Assignee: SCRAMCARD HOLDINGS (HONG KONG) LIMITED

( * ) Notice: Subject to any disclaimer, the term of this patent is extended or adjusted under 35 U.S.C. 154(b) by 0 days.

(21) Appl. No.: 15/777,245

(22) PCT Filed: Nov. 15, 2016

(86) PCT No.: PCT/AU2016/051095
§ 371 (c)(1),
(2) Date: May 18, 2018

(87) PCT Pub. No.: WO2017/083910
PCT Pub. Date: May 29, 2017

(65) Prior Publication Data
US 2018/0336550 A1    Nov. 22, 2018

(30) Foreign Application Priority Data

Nov. 19, 2015  (AU) ................................ 2015904763

(51) Int. Cl.
*G06Q 20/38* (2012.01)
*G06Q 20/32* (2012.01)
(Continued)

(52) U.S. Cl.
CPC ......... *G06Q 20/385* (2013.01); *G06Q 20/227* (2013.01); *G06Q 20/322* (2013.01);
(Continued)

(58) Field of Classification Search
CPC .................................................... G06Q 20/385
See application file for complete search history.

(56) References Cited

U.S. PATENT DOCUMENTS

| 5,585,787 A | 12/1996 | Wallerstein |
| 7,784,692 B1 * | 8/2010 | Arrington, III ...... G06K 7/0008 235/451 |

(Continued)

FOREIGN PATENT DOCUMENTS

| WO | 2012106757 A1 | 8/2012 |
| WO | 2015131225 A1 | 9/2015 |

OTHER PUBLICATIONS

International Search Report and Written Opinion for International Application No. PCT/AU2016/051095 dated Feb. 15, 2017.

(Continued)

*Primary Examiner* — Edward Chang
*Assistant Examiner* — William D Newlon
(74) *Attorney, Agent, or Firm* — Fresh IP PLC; Clifford D. Hyra; Aubrey Y. Chen

(57) ABSTRACT

An electronic payment system includes a wallet server storing account details of one or more payment schemes with which a user has an account; a mobile application operable to indicate to the wallet server which of the one or more payment schemes is to be pre-authorized for a transaction; and a payment card conforming to a payment card standard. Operating the payment card to effect a financial transaction effects a financial transaction using the payment scheme indicated to the wallet server by the mobile application.

14 Claims, 12 Drawing Sheets

(51) Int. Cl.
*G06Q 20/40* (2012.01)
*G06Q 20/22* (2012.01)
*G06Q 20/36* (2012.01)
*G06Q 20/34* (2012.01)

(52) U.S. Cl.
CPC ............ *G06Q 20/34* (2013.01); *G06Q 20/36* (2013.01); *G06Q 20/405* (2013.01); *G06Q 20/4012* (2013.01)

(56) References Cited

U.S. PATENT DOCUMENTS

| | | | | |
|---|---|---|---|---|
| 8,074,877 B2 * | 12/2011 | Mullen | ................ | G06K 9/3233 235/380 |
| 9,251,637 B2 * | 2/2016 | Ashfield | ................ | G06Q 20/24 |
| 2006/0242698 A1 * | 10/2006 | Inskeep | ................ | G06Q 20/385 726/20 |
| 2008/0021829 A1 * | 1/2008 | Kranzley | ................ | G06Q 20/12 705/44 |
| 2013/0048712 A1 * | 2/2013 | Guillaud | ................ | G06K 19/07 235/379 |
| 2013/0054336 A1 * | 2/2013 | Graylin | ................ | G06Q 40/02 705/14.26 |
| 2013/0110719 A1 | 5/2013 | Carter et al. | | |
| 2013/0228616 A1 * | 9/2013 | Bhosle | ................ | G06Q 20/354 235/375 |

OTHER PUBLICATIONS

Extended European Search Report issued in European Patent Application No. 16865294.9 dated Sep. 11, 2018; 8 pages.

\* cited by examiner

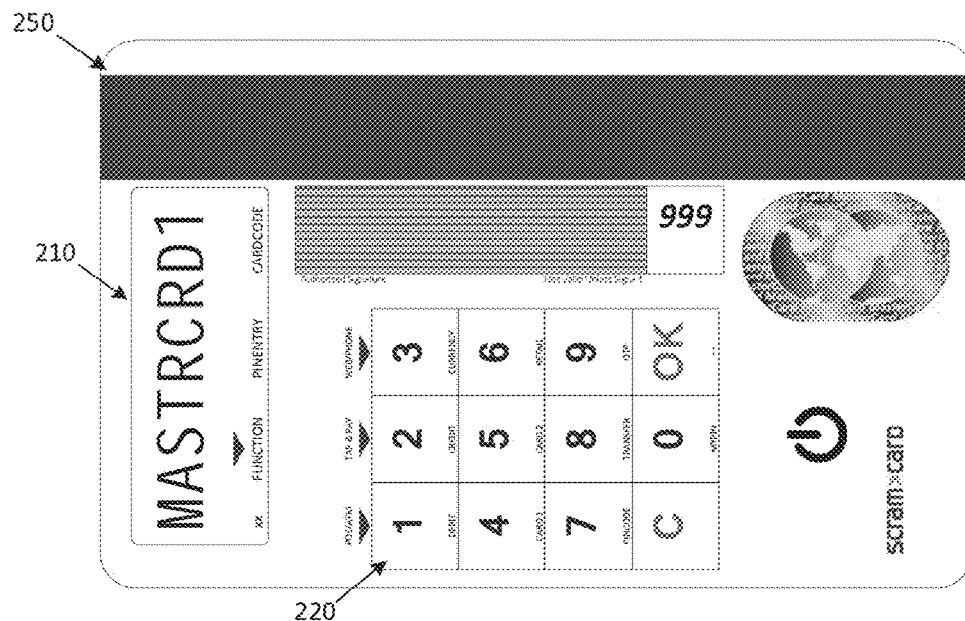
Figure 5A
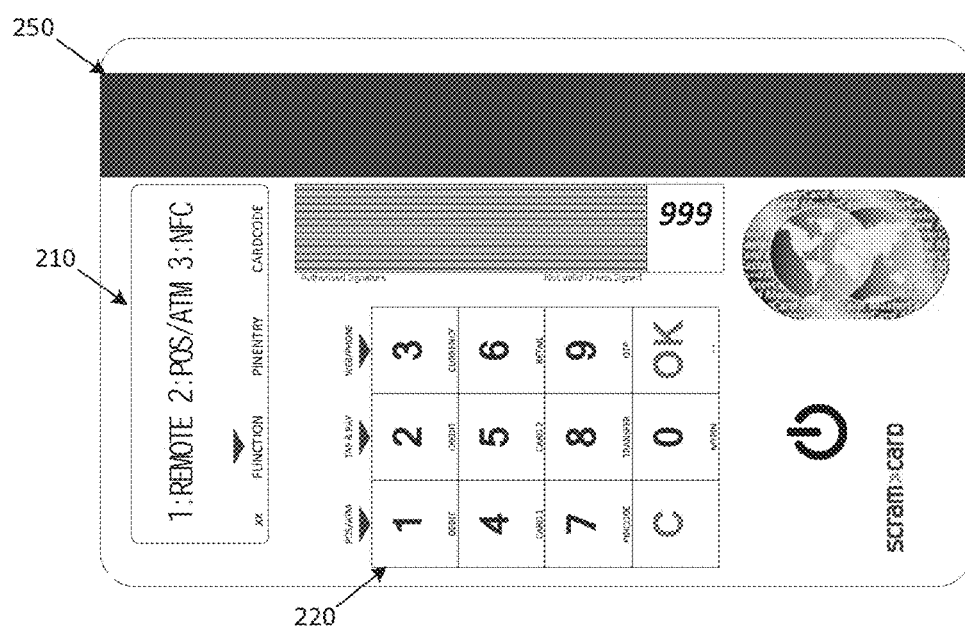
Figure 5B
Figure 5

MULTI-SCHEME PAYMENT INTEGRATED CIRCUIT CARD, PAYMENT SYSTEM, AND PAYMENT METHOD

FIELD OF INVENTION

The present invention relates to integrated circuit cards, systems, and methods for effecting financial transactions. The present invention has particular but not exclusive application with electronic payment methods.

BACKGROUND OF THE INVENTION

It is not uncommon for people to possess more than one credit, debit, or other electronic payment card. Owning more than one electronic payment card inevitably results in a person having to carry with them each of such cards. Carrying multiple cards is, however, rather inconvenient.

A solution to carrying multiple cards has been presented by the inventors of the present application in PCT Publication No. WO/2015/131225, the contents of which are herein incorporated in entirety by cross reference and referred to as the '225 Publication.

The '225 Publication discloses a multi-scheme payment system comprising of a payment integrated circuit (IC) card and a wallet server.

The payment IC card according to the '225 Publication is a smart card complying with ISO7810/ISO7816 standards, and to which multiple Primary Account Numbers (PANs) issued by a payment scheme (e.g. Mastercard™) have been assigned. The payment IC card incorporates a keypad, display, and appropriate internal electronic including a processor, memory, and EMV (or other smart-card compatible standard) chip.

The wallet server according to the '225 Publication stores a mapping of each issued PAN to an actual account number (e.g. a PAN) of a payment scheme (e.g. AMEX™, VISA™, MasterCard™) with which the owner of the payment IC card has an account.

Each PAN issued to the payment IC card is assigned to a key of the keypad, and in this manner, each of the payment schemes with which the owner has an account is effectively also assigned to a key of the keypad.

A process to select and authorize a financial transaction using a desired payment scheme involves a user of the payment IC card operating a key of the keypad to select a PAN that is mapped to that key. The user then interfaces the payment IC card with a smartcard compatible EMV terminal belonging to a vendor, whereupon the payment IC card communicates the issued PAN associated with that key to the smartcard compatible EMV terminal. Subsequently, the smartcard compatible EMV terminal communicates the communicated PAN to the wallet server, which wallet server then determines the actual account number that is mapped to the communicated PAN. The wallet server then executes a payment request with the appropriate payment scheme using the actual account number.

The multi-scheme payment system of the '225 Publication is an effective solution for effecting electronic payment via multiple payment schemes from a single card. However, the system of the '225 Publication requires the vendor to have a POS device that is compliant with the EMV smartcard standard, or other smartcard compatible financial transaction standard (e.g. People's Bank of China (PBOC)).

While the EMV smartcard standard is becoming increasing prevalent in most advanced economies, there are still many economies where the EMV smartcard standard is not yet in common use and which still rely predominantly on magnetic stripe card technology.

Magnetic stripe card technology is unable to process and transact the requisite data in a manner that allows for the secure and reliable implementation of a multi-scheme payment system such as that disclosed by the '225 Publication.

OBJECT OF THE INVENTION

It is one object of the present invention to provide a multi-scheme payment system that is implementable on magnetic stripe card technology to facilitate electronic payments via a number of different payment schemes.

It is another object of the present invention to provide a payment system that is implementable on magnetic stripe card technology to facilitate more secure electronic payments.

This and other objects of the present invention will be made apparent from the following disclosure of the invention.

SUMMARY OF THE INVENTION

According to one aspect of the present invention, an electronic payment system comprises:

a wallet server storing account details of one or more payment schemes with which a user has an account;

a mobile application operable to indicate to the wallet server which of the one or more payment schemes is to be pre-authorized for a transaction; and a payment card conforming to a payment card standard, wherein operation of the payment card to effect a financial transaction effects a financial transaction using the payment scheme indicated to the wallet server by the mobile application.

In one form, operation of the payment card to effect a financial transaction involves interaction of the payment card with a magnetic stripe transaction device, the magnetic stripe transaction device reading from the payment card a primary account number.

Preferably, the transaction device communicates the primary account number to the wallet server, and the wallet server is configured to assess if a user wallet account corresponding to the communicated primary account number has a pre-authorized payment scheme recorded in association therewith.

Preferably, the mobile application is further operable to indicate to the wallet server a pre-authorization window duration, and the wallet server is further configured to assess if the pre-authorization window duration is active.

Preferably, the wallet server is further configured to initiate a payment request with the indicated payment scheme if it is assessed that a pre-authorized payment scheme is recorded in association with the user wallet account, and the pre-authorization window duration is active.

Preferably, the payment card comprises a plurality of keys, and the payment card is issued with a plurality of primary account numbers (PANs) each mapped to a key of the payment card, and further wherein operation of a key generates a one-time passcode (OTP) specific to the PAN mapped to the key.

Preferably, the mobile application is further configured to request a pass code for a payment scheme, and to transmit the pass code to the wallet server.

Preferably, the wallet server is further configured to generate a OTP specific to the payment scheme indicated thereto by the mobile application, and to compare the generated OTP with the passcode received from the mobile application.

Preferably, the mobile application is further configured to indicate to the wallet server a spend limit, and the wallet server is further configured to assess if the spend limit has been exceeded, or will be exceeded by the financial transaction to be effected.

According to a further aspect of the present invention, an electronic payment method comprises:

selecting on a mobile application a payment scheme with which to effect a financial transaction;

communicating the selected payment scheme from the mobile application to a wallet server;

interacting a payment card with a transaction device;

communicating a primary account number (PAN) of the payment card to the wallet server; and conducting a financial transaction using the payment scheme selected by the mobile application.

In one form, interacting the payment card with the transaction device involves swiping a magnetic stripe of the payment card into a magnetic stripe reader of the transaction device, whereby a primary account number of the payment card is communicated to the transaction device.

Preferably, the method further comprises the transaction device communicating the primary account number to the wallet server, and the wallet server assessing if a user wallet account corresponding to the communicated primary account number has a pre-authorized payment scheme recorded in association therewith.

Preferably, the method further comprises the mobile application communicating to the wallet server a pre-authorization window duration, and the wallet server assesses if the pre-authorization window duration is active.

Preferably, the method further comprises the wallet server initiating a payment request with the indicated payment scheme if it is assessed that a pre-authorized payment scheme is recorded in association with the user wallet account, and the pre-authorization window duration is active.

In another form, the payment card comprises a plurality of keys, and the payment card is issued with a plurality of primary account numbers (PANs) each mapped to a key of the payment card, and the method further comprises generating a one-time passcode (OTP) specific to the PAN mapped to a key when the key is operated.

Preferably, the method further comprises the mobile application requesting a pass code for a payment scheme, and transmitting the pass code to the wallet server.

Preferably, the method further comprises the wallet server generating a OTP specific to the payment scheme indicated thereto by the mobile application, and comparing the generated OTP with the passcode received from the mobile application.

Preferably, the method further comprises the mobile application indicating to the wallet server a spend limit, and the wallet server assessing if the spend limit has been exceeded, or will be exceeded by the financial transaction to be effected.

According to a further aspect of the present invention, an electronic payment system comprises: a payment card; and a mobile application operable to indicate to a financial system that a transaction about to be performed on the payment card is an authorized transaction.

Preferably, the payment card is operable to generate a one-time passcode, the mobile application is configured to receive the one-time passcode generated by the payment card and subsequently transmit the one-time passcode to the financial system, and the transaction about to be performed on the payment card is authorized if the one-time passcode received by the financial system corresponds to a one-time passcode generated by the financial system.

Preferably, the mobile application is further operable to indicate to the financial system a pre-authorization window duration, and the financial system is further configured to assess if the pre-authorization window duration is active.

Preferably, the financial system is configured effect the payment request if it is assessed that the pre-authorization window duration is active.

Preferably, the payment card requires the input of a PIN, and the OTP is generated partially based on the inputted PIN.

Preferably, the mobile application is further configured to indicate to the financial system a spend limit, and the financial system is further configured to assess if the spend limit has been exceeded, or will be exceeded by the financial transaction to be effected.

According to a further aspect of the present invention, an electronic payment method comprises:

communicating to a financial system through a mobile application a request to open an authorization window for a payment card;

conducting a financial transaction with the payment card; and authorizing the financial transaction if the authorization window is open.

Preferably, the method further comprises a step of the mobile application being provided with a one-time passcode (OTP), and transmitting the OTP to the financial system to requires opening of the authorization window.

In one form, the financial system opens the authorization window if the OTP sent by the mobile application corresponds to the OTP generated by the financial system.

Preferably, the electronic payment method further comprises a step of the payment card generating the OTP for input into the mobile application.

Preferably, the payment card requires the input of a PIN to generate the OTP, and the payment card generates the OTP partially based on the inputted PIN.

The above aspects, variations, and options are to be understood as comprisable within the invention singly, or in combination with each other.

BRIEF DESCRIPTION OF THE DRAWINGS

In order that the present invention can be more readily understood, reference will now be made to the accompanying drawings which illustrate preferred embodiments of the invention and wherein:

FIG. 5 illustrates an operation of the payment card according to a further embodiment of the present invention;

DETAILED DESCRIPTION OF PREFERRED EMBODIMENTS

Figure 1:
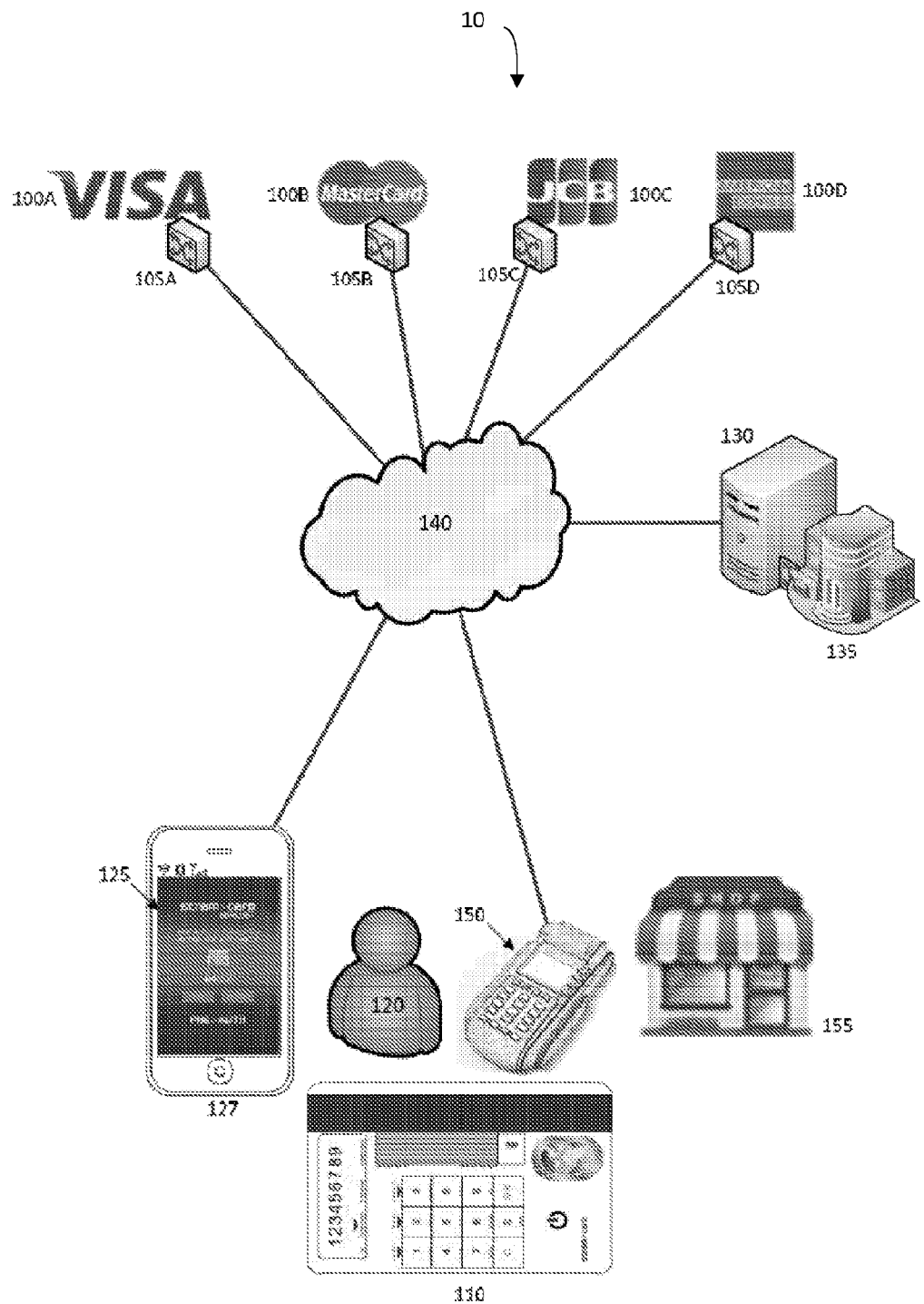
FIG. 1 illustrates a system according to an embodiment of the present invention.

With reference to FIG. 1, a multi-scheme payment system 10 according to a preferred embodiment of the present invention is described.

The system 10 is a system for facilitating electronic payments, such as credit and debit card payments. The system 10 allows a user 120 to make electronic payments using any one of a number of payment schemes 100A, 100B, 100C, 100D with which the user 120 has accounts. The electronic payments are effected from a single payment integrated circuit card 110 (hereinafter referred to as a payment IC card 110) regardless of the payment scheme 100A-D used. The payment IC card 110 incorporates a magnetic stripe and is thereby backwards compatible with magnetic stripe technology transaction devices. The system 10 comprises a wallet server 130, a transaction device 150, the payment IC card 110, and a mobile application 125 all connected via a network 140.

The wallet server 130 is managed by a wallet provider 135 and stores therein a wallet account for the user 120. A user's wallet account stores details for each payment scheme 100A-D that the user 120 has an account with. In one form, the user wallet account stores one or more of the name, primary account number, card type, expiry date, and card code verification number (e.g. CCV2), for one or more credit or debit cards/accounts (e.g. cards/accounts corresponding to each of payment schemes 100A-D) that the user 120 owns.

The transaction device 150, belonging to a vendor 155, is connected to the wallet server 130 via the network 140. The transaction device 150 according to the present invention is a device operable to read magnetic stripe cards. It should be understood that the transaction device 150 may be, for example, a point-of-sale (POS) device, an automatic teller machine (ATM), and any device for interfacing with the payment IC card 1100 to facilitate a transaction. Also connected to the wallet server 130 via the network 140 are financial systems 105A, 105B, 105C, 105D for the one or more payment schemes 100A-D supported by the wallet server 130.

The payment IC card 110 is an integrated circuit card issued by the wallet provider 135. The payment IC card 110 conforms to one or more payment standards. In one form, the payment IC card 110 conforms to the magnetic stripe technology standard, and is therefore compatible with the transaction device 150.

The payment IC card 110 is issued with a plurality of primary account numbers (PANs) from a payment scheme. At least one of the plurality of PANs is stored in correspondence with, or otherwise assigned to, a selectable preset of the payment IC card 110. The at least one PAN is further mapped at the wallet server 130 to a payment scheme 100A-D with which the user has an account. Additionally, the at least one PAN has associated therewith OTP (one-time passcode) generation data that is specific to the at least one PAN. The OTP generation data is used to generate an OTP that is unique to the at least one PAN for a given moment in time. The OTP generation data is specific to the at least one PAN and is stored in both the payment IC card 110 and the wallet server 130. Accordingly, the wallet server 130 is able to generate the same OTP as the payment IC card 110 for the at least one PAN for any given moment in time. It is to be understood that each PAN issued to the payment IC card 110 will have a unique set of OTP generation data associated therewith, whereby unique OTPs for different PANs may be generated for any given moment in time.

One of the plurality of PANs issued to the payment IC card 110 is designated as a default PAN. The default PAN is the PAN that is communicated to the transaction device 150 during a magnetic stripe transaction. The default PAN may be a PAN that is already associated with a selectable preset and payment scheme 100A-D, and may also be a PAN that is otherwise unassociated with any preset and payment scheme 100A-D.

The mobile application 125 is an application that is executable on a mobile electronic device 127, including but not limited to a smartphone, tablet, or smartwatch. The mobile application 125 is connected to the wallet server 130 via the network 140. The mobile application 125 and its operation will be described in greater detail further below.

Figure 2:
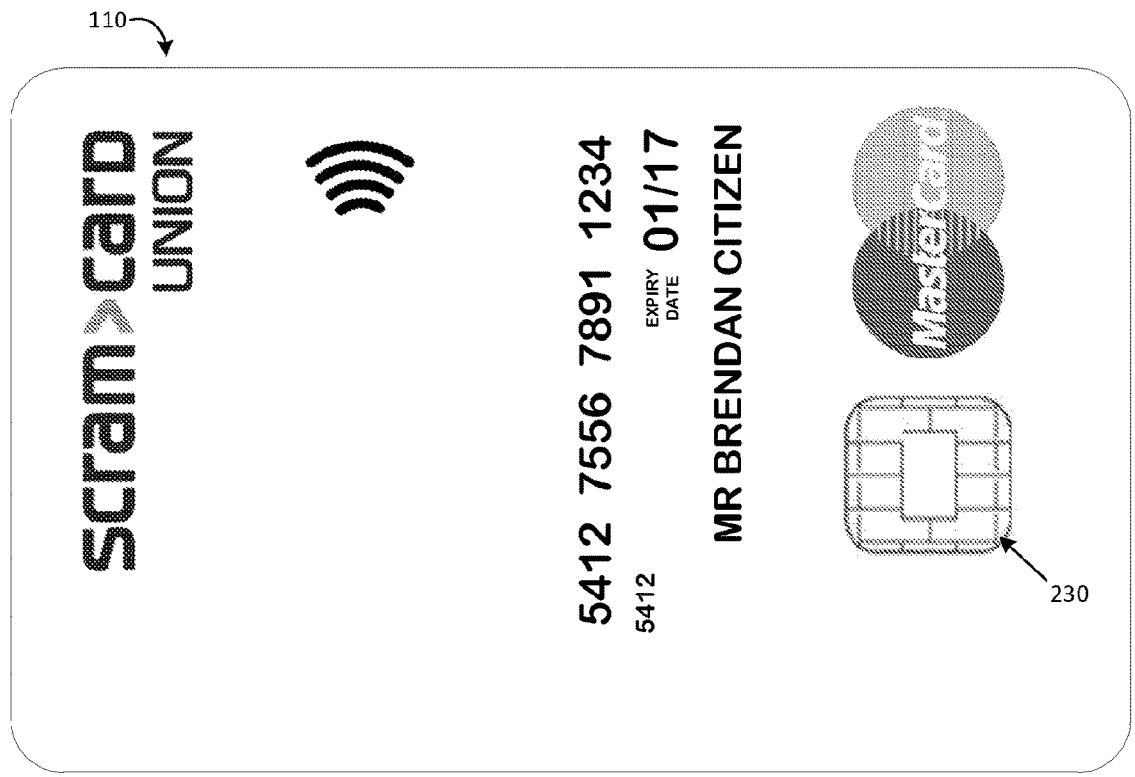
FIG. 2 illustrates a payment card according to an embodiment of the present invention.
Figure 2:
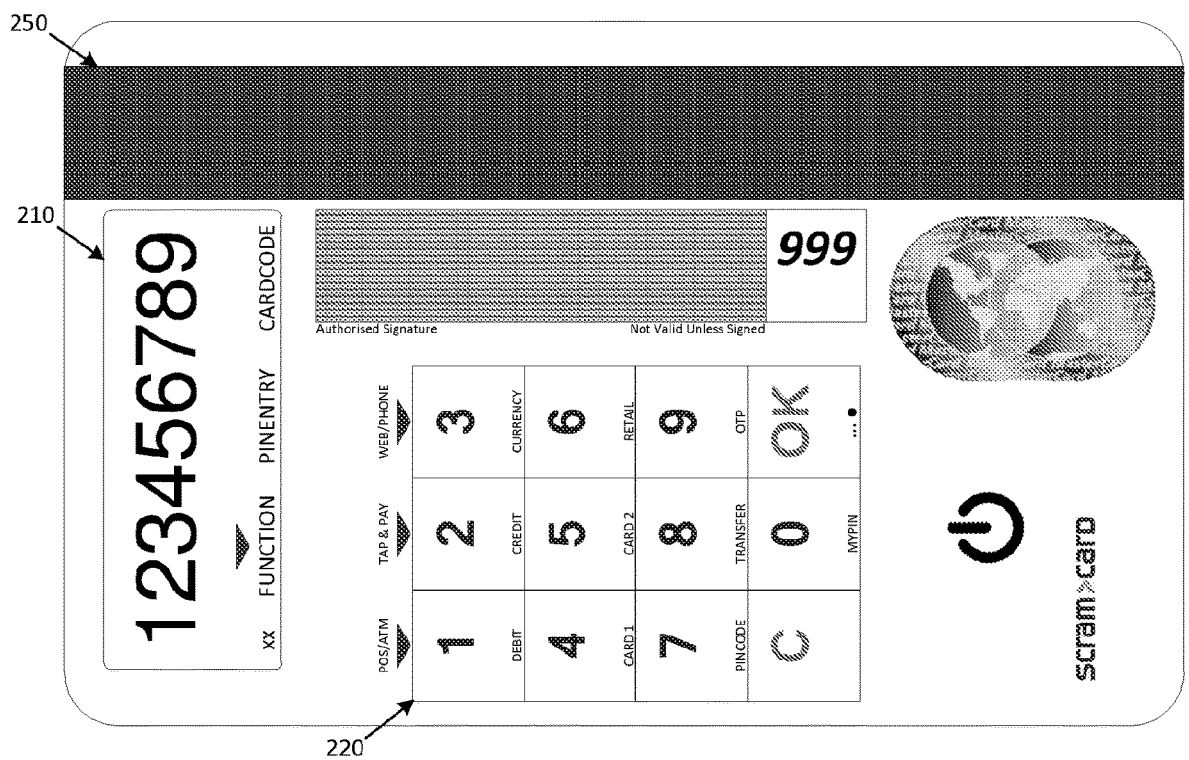

With reference next to FIG. 2, the payment IC card 110 is described in greater detail.

The payment IC card 110 is an integrated circuit card including a display 210, and keypad 220. The payment IC card 110 integrates therein a processor and memory to perform a range of functions. An interface chip 230 is provided to interface the processor and memory with external devices, such as EMV smartcard compatible transaction devices. A magnetic stripe 250 is additionally included to provide backward compatibility with magnetic stripe transaction devices and thereby render the payment IC card 110 compatible with the magnetic stripe technology standard. Software and/or firmware is stored in the memory of the payment IC card 110 to provide various user functions. One of such user functions, as will be described in greater detail below, allows the user 120 to select a PAN that has been pre-stored on the payment IC card 110 in association with a preset, and generate an OTP for that PAN. Others user functions enabled by the software/firmware are for example those as described in the '225 Publication. Other hardware may be integrated in the payment IC card 110, including for example NFC communication hardware, Bluetooth™ communication hardware, backlighting, and the like.

The display 210 is operable to display thereon user prompts, user inputs, card generated outputs, and other information for the user 120. The display 210 in one form is a liquid crystal display. In other forms, the display 210 may be an LED display, OLED display, ELD, electronic paper display, and the like.

The keypad 220 allows interaction with the software and/or firmware programs stored in the memory of the payment IC card 110. As will be detailed below, the keypad 220 acts as an interface for the user 120 to interact with the payment IC card 110 to select, enable, and authorize a pre-stored PAN (and thereby the payment scheme mapped thereto) to effect a transaction.

While various elements of the payment IC card 110 have been illustrated in a certain arrangement in FIG. 1, it is to be understood that the illustration of FIG. 1 is not limiting. A skilled addressee will understand that the various elements, for example the keypad 220, may be arranged in other positions on the payment IC card 110, such as on a front or other surface thereof.

Figure 3:
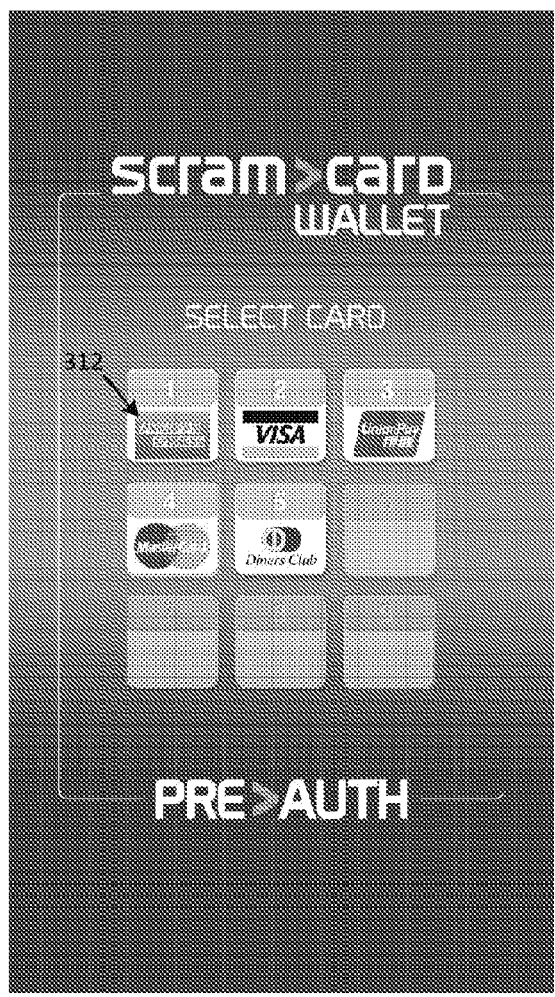
FIG. 3 illustrates a mobile application according to an embodiment of the present invention.
Figure 3:
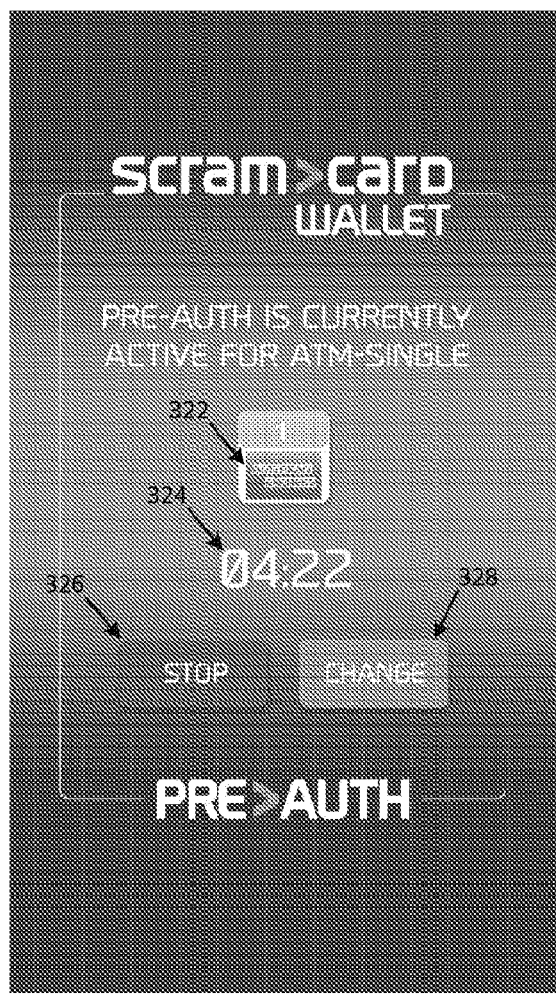
Figure 4:
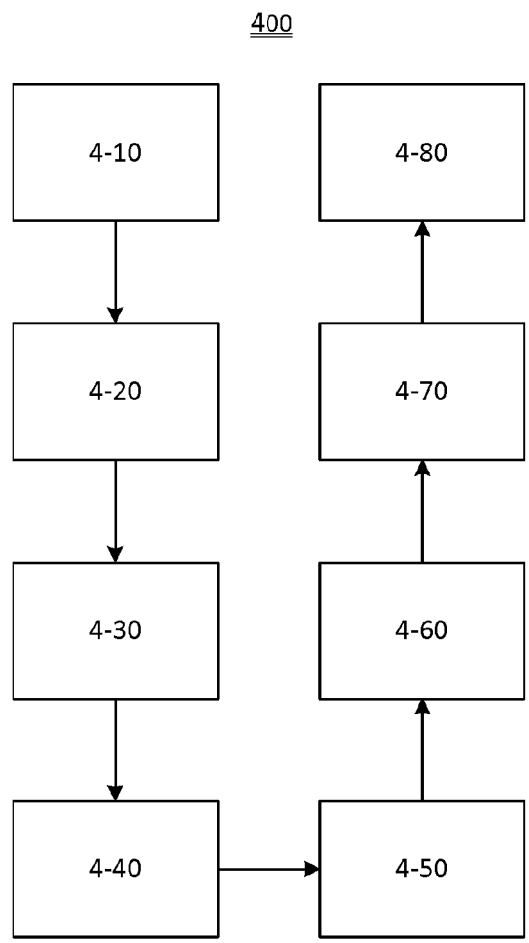
FIG. 4 illustrates an operation to effect a financial transaction according to an embodiment of the present invention.

With reference now to FIGS. 3 and 4, an operation 400 of the payment IC card 110, in tandem with the mobile application 125, to effect a transaction using a payment scheme 100A-D that has been mapped to a PAN of the payment IC card 110 is described.

The operation 400 commences at 4-10, where the user 120 desires to make a financial transaction using, for example, their American Express™ account, which is an account that has been mapped to a PAN issued to the payment IC card 110. At 4-10, the user 120 operates their mobile electronic device 127 so as to execute the mobile application 125. The mobile application 125, upon execution, displays an account selection interface 310 (FIG. 3) displaying all accounts 312 that belong to the user 120, and that have been mapped at the wallet server 130 to a PAN issued to the payment IC card 110.

At 4-20, the user 120 operates the account selection interface 310 to select the account with which the user 120 desires to transact with.

At 4-30, the mobile application communicates with the wallet server 130 via the network 140 to indicate to the wallet server 130 that the user 120 has selected, in this example, their America Express™ account. Additionally, the mobile application communicates to the wallet server 130 an authorization window duration.

At 4-40, the wallet server 130 records the communicated account (in this case, American Express™) as a pre-authorized account 322, and records the communicated authorization window duration as a pre-authorization duration.

At 4-50, the mobile application displays an account live interface 320. The account live interface 320 displays to the user 120 the account 322 that has been pre-authorized for transaction, and a countdown 324 indicative of the remaining duration of the pre-authorization duration.

At 4-60, the user 120 proceeds to swipe the payment IC card 110 into the magnetic stripe compatible transaction device 150. By swiping the payment IC card 110 into the transaction device 150, the aforementioned default PAN is communicated to the transaction device 150.

At 4-70, the transaction device 150 receives the default PAN and recognizes that the default PAN corresponds to an account belonging to the wallet server 130. Accordingly, the transaction device 150 contacts the wallet server 130 through the network 140 and communicates the default PAN to the wallet server 130. Other information as would be typical in a magnetic stripe financial transaction, including for example, the transaction amount, vendor ID, date, time, and the like, are also communicated to the wallet server 130.

At 4-80, the wallet server 130 receives the default PAN from the transaction device 150, and checks if a pre-authorized account has been recorded for the user account that the default PAN belongs to, and further if a pre-authorization window is still active. Since, at 4-40, the wallet server 130 has recorded the user's American Express™ account as the pre-authorized account, and further since (in this example) the pre-authorization window still has a remaining duration of 4:22, the wallet server 130 determines that a transaction is to be made using the user's American Express™ account. In the event that a pre-authorized account has not been recorded and/or the pre-authorization window is no longer open, the transaction device 150 is advised by the wallet server 130 that the transaction is to be declined.

At 4-90, the wallet server contacts the American Express™ payment scheme 100D and performs a financial transaction therewith in the conventional manner. The financial transaction is either approved or declined in the conventional manner, and the approval/declination communicated back to the wallet server 130, which in turns informs the transaction device 150 of the result.

By way of the operation 400, and in particular the tandem use of the mobile application 125 with the payment IC card 110, a specific account out of the plurality of accounts mapped to the payment IC card 110 can be identified to transact with.

As further illustrated in the account live interface 320, the pre-authorization window can be prematurely closed via the "STOP" button 326 if the user 120 has completed the transaction before the pre-authorization window duration has elapsed, or the user 120 has otherwise decided not to progress with a transaction. The wallet server 130 and the mobile application 125 may also be configured to only allow a single transaction at a time, and accordingly close the pre-authorization window automatically as soon as a transaction is completed. The user 120 may also change the account with which to effect the transaction via the "CHANGE" button 328, for example if a credit limit for the user's American Express™ account has been reached.

The system 10, by employing the mobile application 125 and executing the operation 400, does not require the transaction device 125 to be smartcard compatible, and therefore can be implemented with non-smartcard enabled transaction devices such as magnetic stripe transaction devices.

Figure 6:
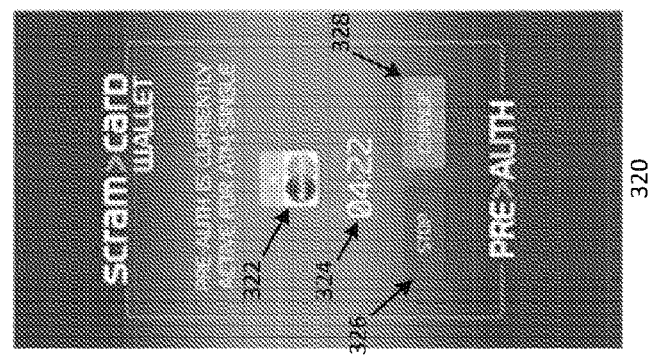
FIG. 6 illustrates a mobile application according to a further embodiment of the present invention.
Figure 6:
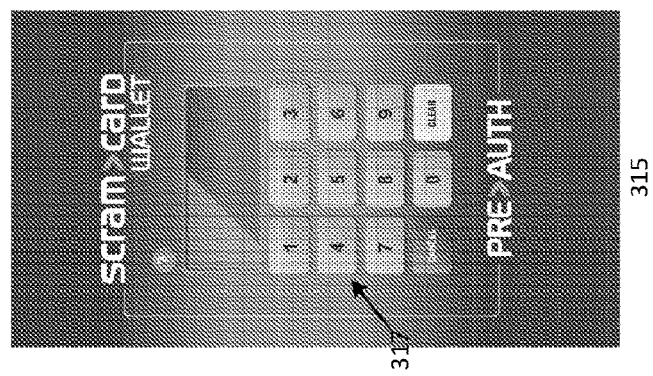
Figure 6:
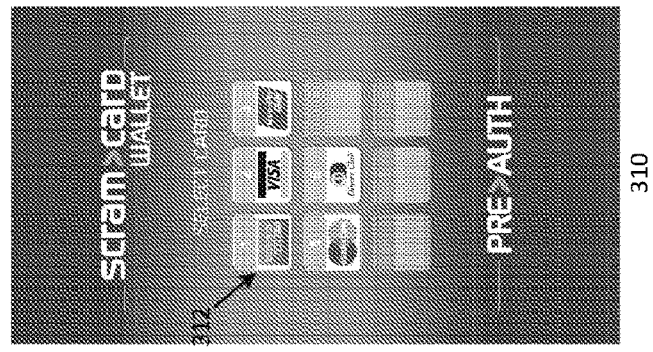
Figure 7:
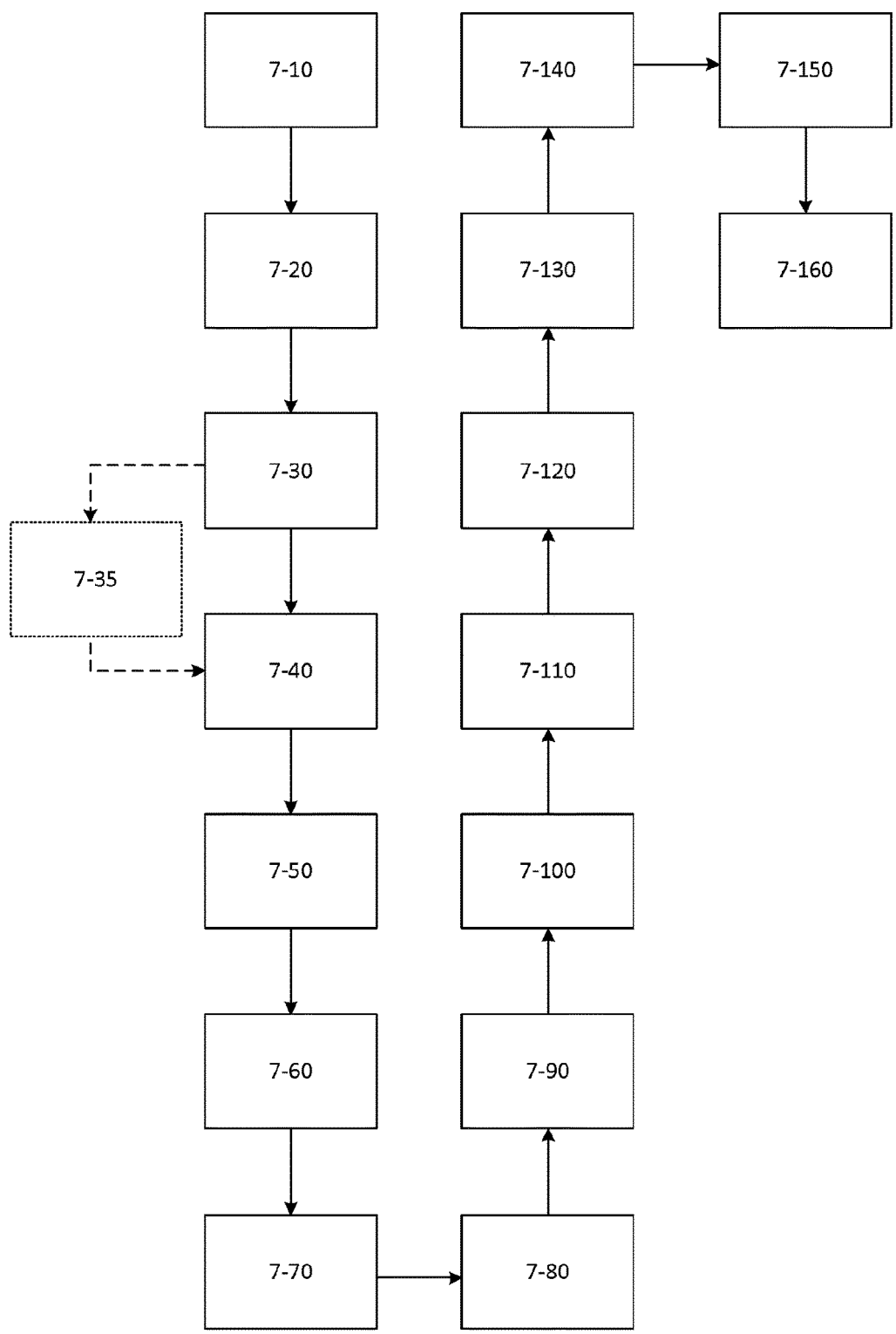
FIG. 7 illustrates an operation to effect a financial transaction according to a further embodiment of the present invention.

With reference to FIGS. 5 to 7, a second form of the mobile application 125 and a corresponding operation 700 is described. The second form of the mobile application 125 and operation 700 provides a higher level of security compared to the operation 400.

Referring first to FIGS. 5A-5C of FIG. 5, an operation of the payment IC card 110 to select, enable, and authorize a preset payment scheme for a transaction is described. For purposes of description, it is assumed that various PANs have previously been pre-stored in the payment IC card 110 in correspondence with respective keys of the keypads, and which PANs have further been mapped at the wallet server 130 to respective payment schemes 100A-D. An operation for pre-storing a PAN in correspondence with a key of the keypad 220, and mapping a PAN to a payment scheme 100A-D, may be as per the operation described in the '225 Publication, but not limited thereto.

To select a payment scheme with which to perform a transaction, a key of the keypad 220 to which a PAN corresponding to the desired payment scheme has been preset to is operated. For purposes of this description, it is assumed that the user's MasterCard™ account 100B has been previously assigned to key "1" on the keypad 220 of the payment IC card 110.

Upon operating the key "1", the display 210 displays a description of the account/payment scheme assigned to the key "1" for confirmation, which in this case is "MASTRCRD1". FIG. 5A illustrates the payment IC card 110 in this state. The user confirms their desire to effect a transaction using "MASTRCRD1" by pressing "OK" on the keypad 220.

Following confirmation that "MASTRCRD1" is the desired account, the user is prompted to indicate whether the transaction will be a "REMOTE", "POS/ATM)", of "NFC" transaction. FIG. 5B illustrates the payment IC card 110 in this state.

Indicating that the transaction will be a "POS/ATM" transaction causes the payment IC card 110 to execute a process to generate a one-time pin (OTP), which is then displayed on the display 210. The generation of the OTP may be in accordance with the operation as described in the '225 Publication but not limited thereto, but essentially involves use of the aforementioned OTP generation data, and may further require the user to input via the keypad 220 a static PIN. The generated OTP 510 is displayed on the display 210. FIG. 5C illustrates the payment IC card 110 in this state.

The generated OTP 510 is the authenticating feature which determines if a transaction using the selected payment scheme should be allowed. Generation of the OTP 510, and use thereof by other operations such as the operation 600 of FIG. 6, allows a financial transaction to be effected with a higher level of security as will now be described in with reference to FIGS. 6 and 7.

As illustrated in FIG. 6, the second form of the mobile application 125 comprises the account selection interface 310, an authentication interface 315, and the account live interface 320.

As illustrated in FIG. 7, the operation 700 commences at 7-10 where the user 120 desires to make a financial transaction using, for example, their MasterCard™ account, which is an account that has been mapped to a PAN issued to the payment IC card 110. At 7-10, the user operates the payment IC card 110 to operate the key "1" to which the MasterCard™ account has been preset to. Upon operating the key "1", the display 210 of the payment IC card 110 displays "MASTRCRD1" (see FIG. 5A), allowing the user to confirm that they have selected the intended account. The user 120 operates the "OK" key on the keypad 220 to confirm their selection.

At 7-20, and as illustrated in FIG. 5B, the user 120 is prompted to indicate the type of transaction they wish to perform. In this example, the user 120 desires to perform a "POS/ATM)" transaction, and accordingly operates the key "2" on the keypad 220.

At 7-30, the payment IC card 110 generates an OTP using the aforementioned OTP generation data that is specific to the "MASTRCRD1" account, and if desired, a PIN entry (7-35) entered by the user 120 using the keypad 120. In this manner, an OTP specific to the "MASTRCRD1" account is generated. The generated OTP 510 is displayed on the display 220, as illustrated by FIG. 5C.

At 7-40, the user 120 operates their mobile electronic device so as to execute the mobile application 125. The mobile application 125, upon execution, displays the account selection interface 310 (FIG. 6) displaying all accounts that belong to the user 120, and that have been mapped by the wallet server 130 to a PAN issued to the payment IC card 110.

At 7-50, the user 120 operates the account selection interface 310 to select the account with which the user 120 desires to transact with. In this example, the user 120 selects the MasterCard™ account.

At 7-60, the mobile application displays the authentication interface 315, which prompts the user 120 for a code that is specific to the selected MasterCard™ account.

At 7-70, the user 120 enters into the authentication interface 315 the OTP generated at 7-30. The OTP may be entered into the authentication interface 315 either manually by the user 120 using the buttons 317 of the interface 315, or if the mobile electronic device 127 on which the mobile application 125 is being executed has near-field communication (NFC) capability, the OTP can be entered into the authentication interface 315 using an NFC transmission from the payment IC card 110 to the mobile electronic device 127.

At 7-80, the mobile application 125 communicates with the wallet server 130 via the network 140 to indicate to the wallet server 130 that the user 120 has selected, in this example, their MasterCard™ account. Additionally, the mobile application 125 communicates to the wallet server 130 the OTP that was entered at 7-70 into the authentication interface 310. Still further, the mobile application 125 communicates to the wallet server 130 an authorization window duration.

At 7-90, the wallet server 130 generates an OTP using OTP generation data stored therein in association with the user's MasterCard™ account, which should be identical to the OTP generation data stored on the payment IC card 110 in association with the PAN/preset corresponding to the user's MasterCard™. If desired, the wallet server 130 may further include a predetermined PIN in the generation of the OTP. The predetermined PIN should be identical to the correct PIN that was requested of the user 120, if requested, at 7-35.

At 7-100, the wallet server 130 compares the OTP it has generated with the OTP received from the mobile application 125. The two OTPs will match if the same OTP generation data was used by the payment IC card 110 and the wallet server 130 to generate the OTPs. That is, the payment IC card 110 operated by the user 120 to generate the OTP is one that validly belongs to the user 120 and is associated with the user's wallet account. If a PIN was requested of the user at 7-35, then the OTPs will match further only if the PIN that was entered by the user at 7-35 is identical to the predetermined PIN stored by the wallet server 130 in association with the user's wallet account for the Master-Card™ account. That is, the person operating the payment IC card 120 is a person who knows this predetermined PIN, and is assumedly therefore the user 120 and owner of the wallet account and payment IC card 110.

At 7-110, if the OTP generated by the wallet server 130 matches that received from the mobile application 125, the wallet server 130 records the communicated account (in this case, MasterCard™) as a pre-authorized account, and records the communicated authorization window duration as a pre-authorization duration. For purposes of this description, it is assumed that the two OTPs match, and the wallet server 130 records the user's MasterCard™ account as the pre-authorized account, and records a duration of 5:00 as the pre-authorization duration. In the event that the two OTPs do not match, no account is registered as the pre-authorized account, nor is a pre-authorization window duration recorded, and the wallet server 130 advises the transaction device 150 that the instant transaction is declined.

At 7-120, the mobile application displays an account live interface 320 (FIG. 6). The account live interface 320 displays to the user 120 the account 322 that has been pre-authorized for transaction, and a countdown 324 indicative of the remaining duration of the pre-authorization duration.

At 7-130, the user 120 proceeds to swipe the payment IC card 110 into the magnetic stripe compatible transaction device 150. By swiping the payment IC card 110 into the transaction device 150, the aforementioned default PAN is communicated to the transaction device 150.

At 7-140, the transaction device 150 receives the default PAN and recognizes that the default PAN corresponds to an account belonging to the wallet server 130. Accordingly, the transaction device 150 contacts the wallet server 130 through the network 140 and communicates the default PAN to the wallet server 130. Other information as would be typical in a magnetic stripe financial transaction, including for example, the transaction amount, vendor ID, date, time, and the like, are also communicated to the wallet server 130.

At 7-150, the wallet server 130 receives the default PAN from the transaction device 150, and checks if a pre-authorized account has been recorded for the user account that the default PAN belongs to, and further if a pre-authorization window is still active. Since, at 7-110, the wallet server 130 has recorded the user's MasterCard™ account as the pre-authorized account, and further since (in this example) the pre-authorization window still has a remaining duration of 4:22, the wallet server 130 determines that a transaction is to be made using the user's Master-Card™ account. Conversely, if for example previously at 7-110 the OTP generated by the wallet server 130 did not match the OTP received from the mobile application 125, no account would be recorded as the pre-authorized account and/or the pre-authorization window duration would be 0:00 or a NULL value, causing the wallet server 130 to reject the transaction request from the transaction device 150.

At 7-160, the wallet server contacts the MasterCard™ payment scheme 100B and performs a financial transaction therewith in the conventional manner. The financial transaction is either approved or declined in the conventional manner, and the approval/declination communicated back to the wallet server 130, which in turns informs the transaction device 150 of the result.

The operation 700, in requiring an OTP to be entered into the authentication interface 315, improves the security of transactions performed using the system 10. In particular, attempts to create a counterfeit card having the same default PAN as the user's card are rendered ineffective. Additionally, in the case where the user is required to enter a PIN at 7-35 into the payment IC card 110 in order to generate the OTP, theft of the payment IC card 110 is rendered significantly less effective. Still further, the requirement of the OTP renders attempts to create fraudulent software to pass-off as the mobile application 125 also ineffective.

Figure 8:
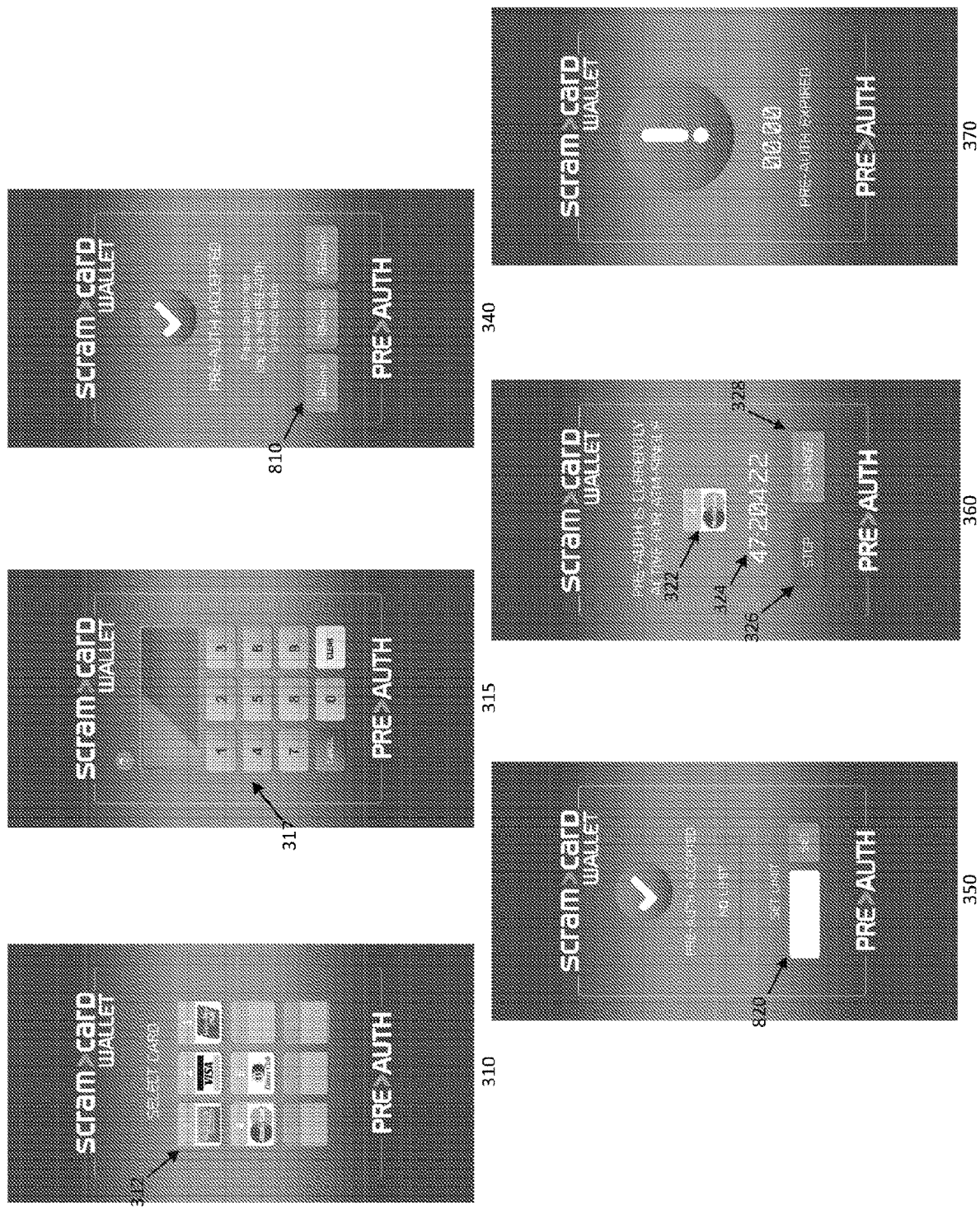
FIG. 8 illustrates a mobile application according to a further embodiment of the present invention.
Figure 9:
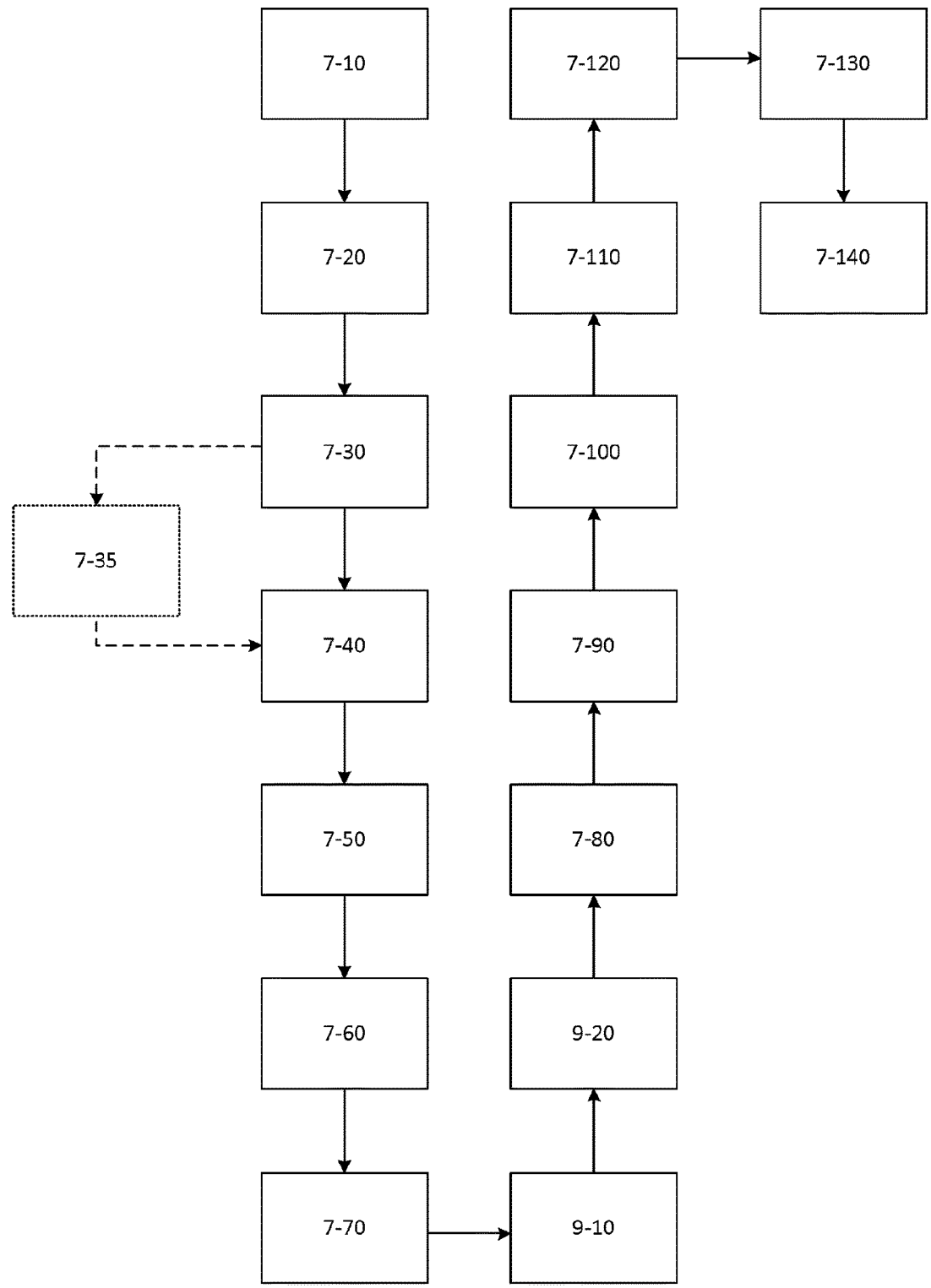
FIG. 9 illustrates an operation to effect a financial transaction according to a further embodiment of the present invention.

With reference to FIGS. 8 and 9, a third form of the mobile application 125 and a corresponding operation 900 is described. The third form of the mobile application 125 and the operation 900 provide greater convenience for the user 120 in allowing the user to set a custom authorization window duration and/or a spend limit.

As illustrated in FIG. 8, the third form of the mobile application 125 includes the same account interface 310 and authentication interface 315 as the second form of the mobile application 125 illustrated in FIG. 6. Additionally, the third form of the mobile application 125 includes a duration setting interface 340, a spend setting interface 350, an account live interface 360, and a limit warning interface 370.

As illustrated in FIG. 9, the operation 900 is largely similar to the operation 700, and like reference numerals are used to refer to like steps from the operation 700. These like steps of operation 900 are therefore not hereinafter further described except insofar as to describe any differences with their counterparts from the operation 700.

The operation 900 further includes additional steps 9-10 to 9-20. Step 9-10 occurs after 7-70. At 9-10, the duration setting interface 340 is displayed to the user 120. The duration setting interface 340 prompts the user to select or enter in a custom pre-authentication window duration 810. The custom duration may be selected from a preselected range of options (as illustrated in FIG. 8), or maybe be entered as a bespoke duration.

At 9-20, the spend setting interface 350 is displayed to the user 120. The spend setting interface 350 prompts the user to enter in a maximum spend limit 820 for the account selected at 7-50 for the duration entered at 9-10.

Step 7-80 of the operation 900 is similar to that of the operation 700, however the custom duration 810 is communicated to the wallet server 130 as the authorization window duration and the spend limit 820 is additionally communicated to the wallet server 130.

Steps 7-90 to 7-100 are identical to those performed for the operation 700.

Step 7-110 of the operation 900 is similar to that of the operation 700, however the spend limit 820 is additional recorded as a pre-authorized limit.

Step 7-120 of the operation 900 is identical to that of the operation 700. In the example illustrated in FIG. 8, it can be seen that the counter 324 displays the remaining time from the custom duration 810.

Steps 7-130 to 7-140 are identical to those performed for the operation 700.

Step 7-150 of the operation 900 is similar to that of the operation 700, however, an additional check to confirm that the maximum spend limit has not yet been reached is performed. The wallet server 130 determines that the transaction should be made if a pre-authorized account is recorded, the pre-authorization window is still active, and the maximum spend limit 820 has not yet been reached and will not be reached by the current transaction.

Step 7-160 is identical to that performed for the operation 700.

Step 7-170 is an additional step that may be performed automatically, or on request by the user 120. At 7-170, a balance of the remaining pre-authentication duration and/or maximum spend limit is displayed to the user 120 in the form of the limit warning interface 370.

The operation 700 allows multiple transaction to be pre-authorized for a specific payment scheme 100A-D, and for a longer duration. The ability to do so is particularly convenient when the user 120 envisages having to use one payment scheme in particular on a regular basis over a certain period of time. For example, the functionality provided by the operation 700 may be particularly convenient when the user 120 is travelling in a country where only one of the user's payment scheme accounts is accepted.

A modification to the operation 700 involves setting the pre-authorization window duration to an infinite time, thereby effectively rendering a specific payment scheme 100A-D as a default payment scheme to be used anytime a magnetic stripe transaction is performed.

Figure 10:
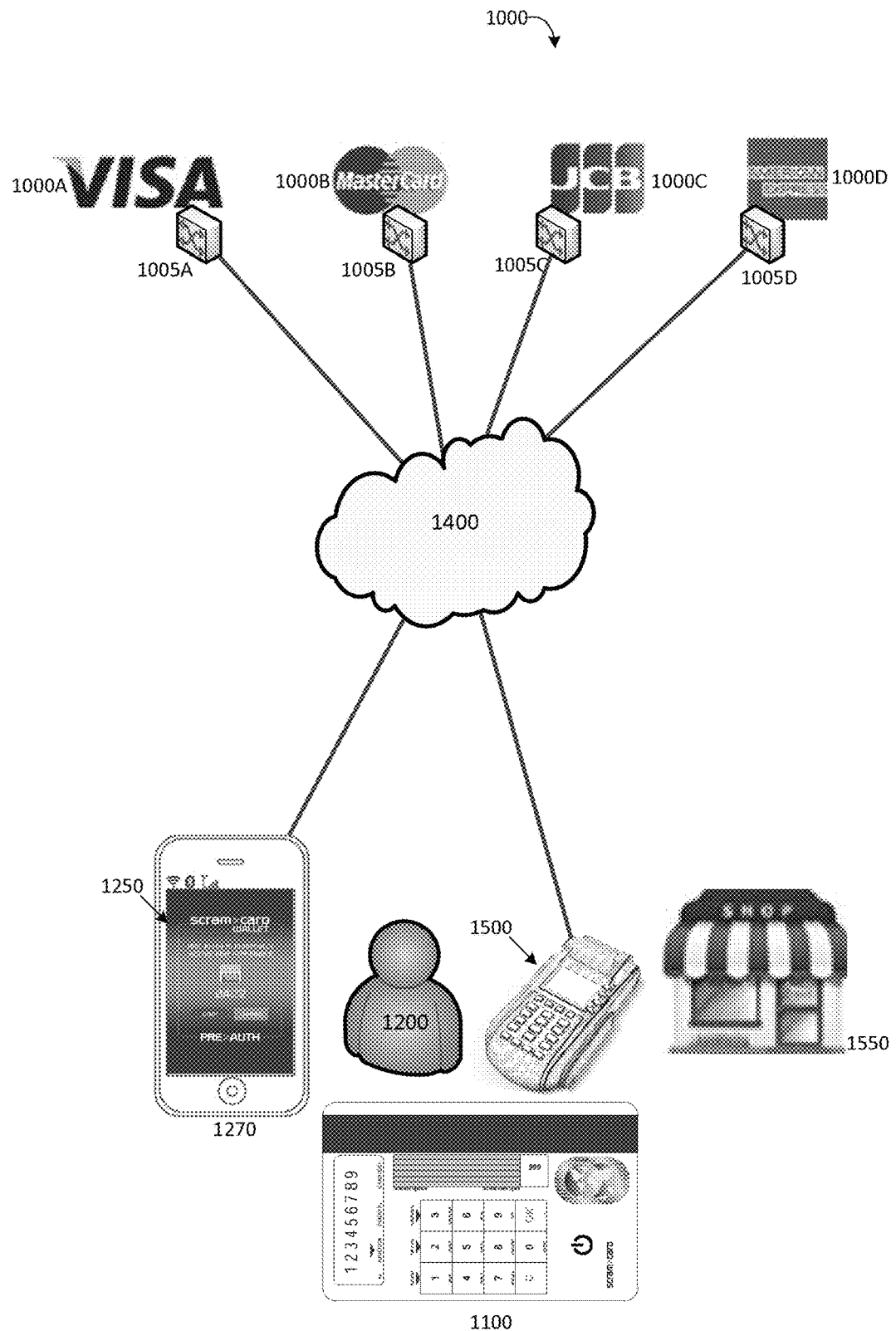
FIG. 10 illustrates a system according to a further embodiment of the present invention.

With reference now to FIG. 10, a payment system 1000 according to a second embodiment of the present invention is described.

The system 1000 is a system for facilitating electronic payments, such as credit and debit card payments. The system 1000 allows a user 120 to make electronic payments using a payment scheme 1000A, 1000B, 1000C, 1000D with which the user 1200 has an account. The electronic payments are effected from a payment IC card 1100. The payment IC card 1100 incorporates a magnetic stripe and is thereby backwards compatible with magnetic stripe technology. The system 1000 comprises, a transaction device 1500, the payment IC card 1100, and a mobile application 1250 all connected via a network 1400.

The transaction device 1500, belonging to a vendor 1550, is connected to one or more financial systems 1005A-D of respective payment schemes 1000A-D via the network 1400. The transaction device 150 according to the present invention is a device operable to read magnetic stripe cards. It should be understood that the transaction device 150 includes, for example, point-of-sale (POS) devices, Automatic Teller Machine (ATM), and the like.

The payment IC card 1100 is an integrated circuit card issued directly or indirectly by one of the payment schemes 1000A-D. The payment IC card 1100 conforms to a payment standard. In one form, the payment IC card 1100 conforms to the magnetic stripe technology standard, and is therefore compatible with the transaction device 1500. The payment IC card 1100 is in all essential respects identical to the payment IC card 110 as previously described with reference to FIG. 2.

The payment IC card 1100 is issued with at least one primary account number (PAN) from a payment scheme. The at least one PAN has associated therewith OTP (one-time passcode) generation data that is specific to the at least one PAN. The OTP generation data is used to generate an OTP that is unique to the at least one PAN for a given moment in time. The OTP generation data is specific to the at least one PAN and is stored in both the payment IC card 1100 and the financial system 1005A-D corresponding to the payment scheme issuing the PAN. Accordingly, the corresponding financial system 1005A-D is able to generate the same OTP as the payment IC card 1100 for the at least one PAN for any given moment in time.

The mobile application 1250 is an application that is executable on a mobile electronic device 1270, including but not limited to a smartphone, tablet, or smartwatch. The mobile application 1250 is connected to the financial systems 1005A-D via the network 1400. The mobile application 1250 and its operation will be described in greater detail further below.

Figure 11:
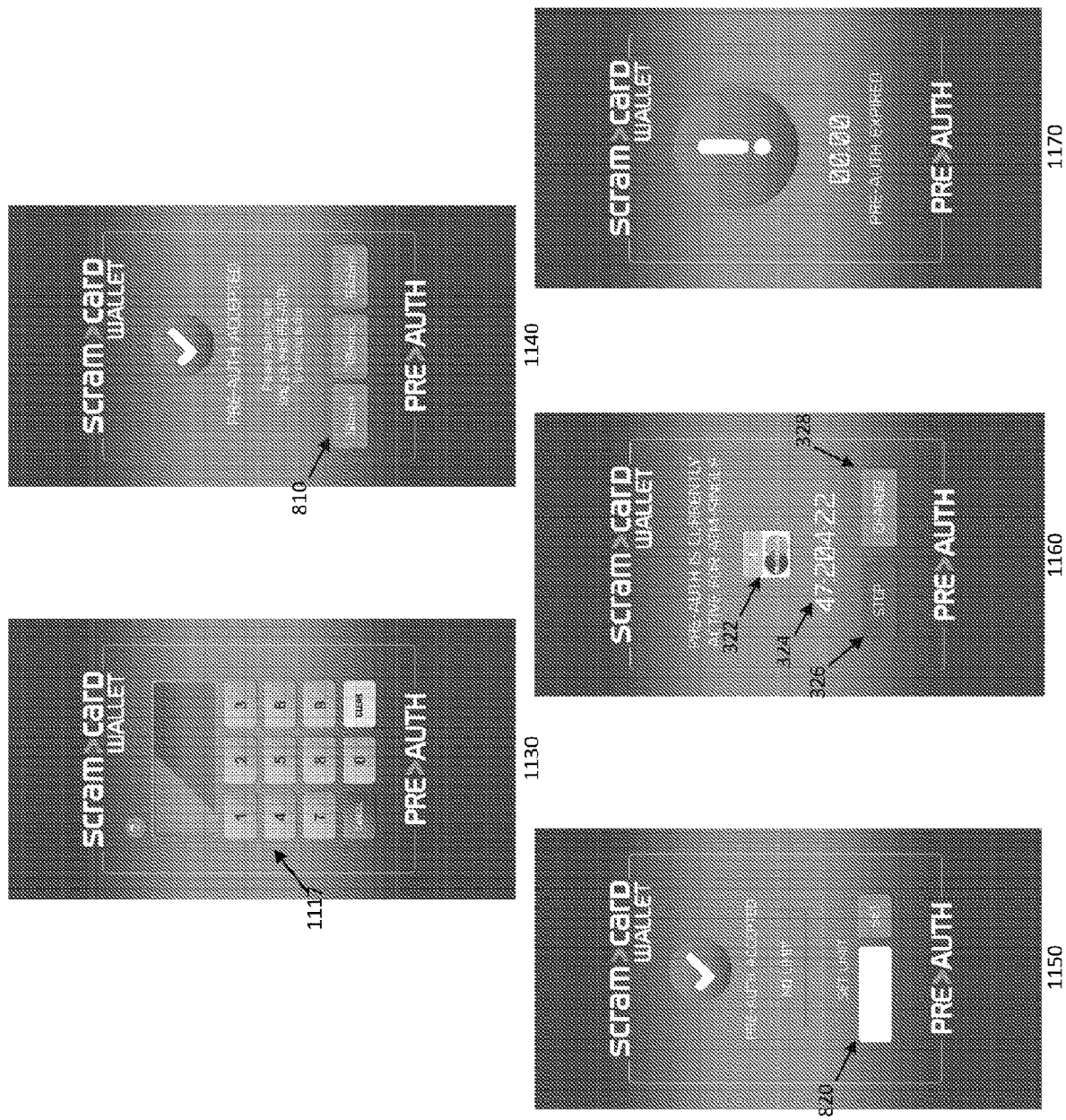
FIG. 11 illustrates a mobile application according to a further embodiment of the present invention.
Figure 12:
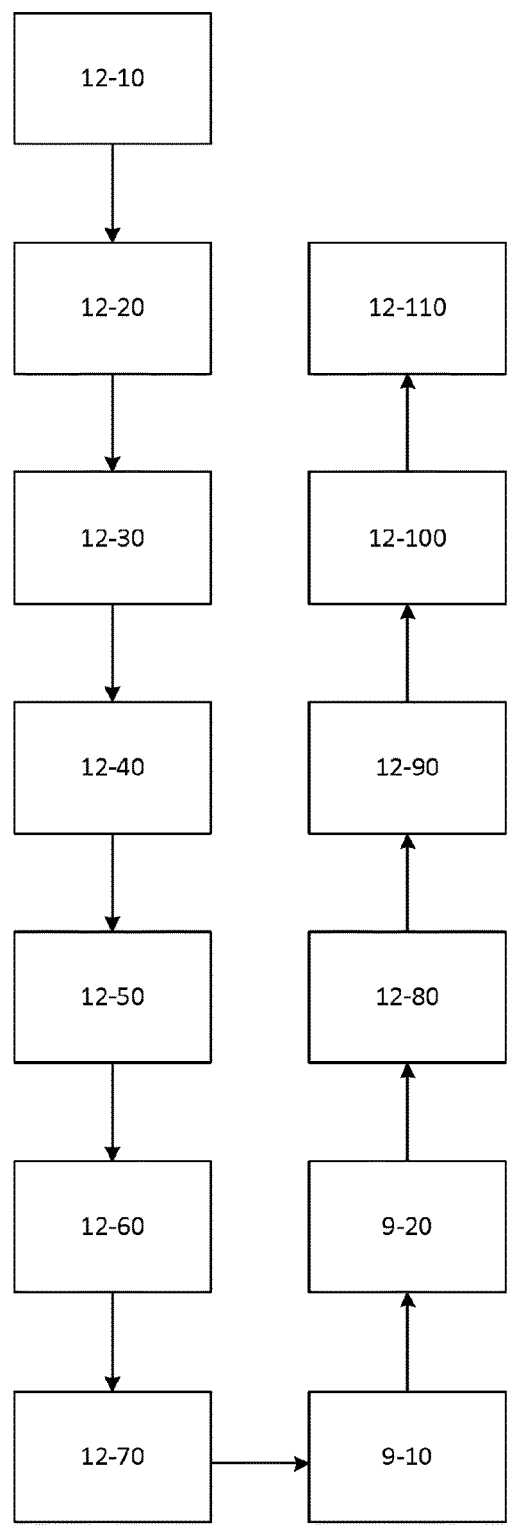
FIG. 12 illustrates an operation to effect a financial transaction according to a further embodiment of the present invention.

With reference now to FIGS. 11 and 12, an operation 1200 of the payment IC card 1100, in tandem with the mobile application 1250, to effect a transaction using the payment IC card 1100 and the system 1000 is described. For purposes of this description, the payment IC card 1100 is assumed that the payment IC card 1100 has been issued with one PAN only, and the PAN is a PAN issued by the MasterCard™ payment scheme 1000A.

The operation 400, in a preferred form, commences at 12-10, where, the user 1200 operates the payment IC card 1100 to generate an OTP. The OTP is generated by the payment IC card 1100 using the OTP generation data specific to the issued PAN and optionally further using a static PIN entered by the user 1200 into the payment IC card 1100. Once generated, the OTP is displayed by the payment IC card 1100 on the display 210. In other forms, the generation of the OTP at 12-10 may be skipped.

At 12-20, the user 1200 operates their mobile electronic device 1270 so as to execute the mobile application 1250. Upon execution, the mobile application 1250, displays an authentication interface 1130 (FIG. 11) prompting the user 1200 to enter the OTP. The OTP generated at 12-10 by the payment IC card 1100 is accordingly entered by the user 1200 into the authentication interface 1130.

At 12-30, in the preferred form the mobile application 1250 next displays a duration setting interface 1140. The duration setting interface 1140 prompts the user 1120 to select or enter a custom pre-authentication window duration 810. In other forms, the duration setting interface 1140 may be skipped.

At 12-40, in the preferred form the mobile application 1250 preferably next displays a spend setting interface 1150. The spend setting interface 1150 prompts the user to enter in a maximum spend limit 820. In other forms, the spend setting interface 1150 may be skipped.

At 12-50, the mobile application 1250 communicates with the MasterCard™ financial system 1005B over the network 1400 to transmit thereto the OTP. Additionally, the mobile application 1250 further transmits to the financial system 1005B the custom pre-authentication window duration 810, and the maximum spend limit 820, if such were entered at 12-30 and 12-40.

At 12-60, the financial system 1005B generates an OTP using OTP generation data stored therein in association with the user's MasterCard™ account. In the preferred form where a static PIN was entered at 12-10 and further used in the generation of the OTP at 12-10, the financial system 1005B similar further uses a static PIN stored therein to generate the OTP.

At 12-70, the OTP generated by the financial system 1005B is compared with the OTP received from the mobile application 1250. If the two OTPs match, a pre-authorization to conduct a financial transaction within a predetermined duration and up to a predetermined spend limit is set. The predetermined duration is set as the custom pre-authentication window duration 810, if one was entered at 12-30. If a custom pre-authentication window duration was not set at 12-30, the predetermined duration is set to a default duration of, for example, 5 minutes or to a once-off approval. The predetermined spend limit is set as the maximum spend limit 820, if one was entered at 12-40. If a maximum spend limit was not set at 12-40, the predetermined spend limit is set to a default value, or set to no limit.

If the two OTPs do not match, the pre-authorization to conduct a financial transaction is not set.

At 12-80, the user 1200 swipes the payment IC card 1100 into the magnetic stripe compatible transaction device 1500. By swiping the payment IC card 110 into the transaction device 150, the PAN is communicated to the transaction device 150.

At 12-90, the transaction device 1500 receives the default PAN and recognizes that the default PAN corresponds to an account belonging to the MasterCard™ scheme 1000B. Accordingly, the transaction device 1500 contacts the MasterCard™ financial system 1005B through the network 1400 and communicates the PAN to the financial system 1005B. Other information as would be typical in a magnetic stripe financial transaction, including for example, the transaction amount, vendor ID, date, time, and the like, are also communicated to the financial system 1005B.

At 12-100, the financial system 1005B receives the PAN from the transaction device 1500, and checks if a pre-authorization to conduct a financial transaction has been set. A pre-authorization would have been set at 12-70 if the two OTPs matched. The financial transaction is approved if the pre-authorization is set, the predetermined duration is still active, and the maximum spend limit has not yet been reached, and will not be reached by effecting the financial transaction. Conversely, the financial transaction is declined by the MasterCard™ financial system 1005B if the pre-authorization is not set, the predetermined duration is no longer active, and/or the maximum spend limit has already been reached or will be reached by effecting the financial transaction.

At 12-110, an account live interface 1160 and a limit warning interface 1170 may be optionally displayed by the mobile application 1250 to indicate to the user 1200 how much duration and/or spend limit is remaining for the pre-authorization set in 12-70.

By way of the operation 1100, and in particular the tandem use of the mobile application 1250 with the payment IC card 1100, conventional magnetic stripe transactions can be made more secure.

Advantages

The advantages of the present invention include the ability for users to transact using any payment scheme with which they have an account, from a single card, and via the older generation magnetic stripe technology. Accordingly, there is no longer the need for users to carry with them multiple cards.

Moreover, the present invention provides a method and system by which magnetic stripe transactions can be made more secure, through the co-use of the mobile application.

Still further, the present invention allows users to transact with a vendor using a payment scheme that the vendor does not accept. Accordingly, payment schemes such as Diners Club™ and American Express™ which tend to offer better incentives to users but which are not as widely accepted, my still be used at vendors which do not accept such payment schemes.

The present invention further obviates the need for collaboration or agreement between the various payment schemes. The technological solution presented by the present invention hence renders feasible what would otherwise be, from a business perspective, an unfeasible solution.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The claims defining the invention are as follows:

1. An electronic payment system, the system comprising:
   a wallet server storing account details of one or more payment schemes with which a user has an account;
   a mobile application operable to display the one or more payment schemes and operable to allow selection of one of the one or more payment schemes to indicate to the wallet server which of the one or more payment schemes is pre-authorized for a transaction thereby providing a first level of security, wherein the mobile application is further operable to indicate to the wallet server a pre-authorization window duration, and the wallet server is further configured to assess if the pre-authorization window duration is active; and
   a payment card comprising a plurality of keys, wherein the payment card is issued with a plurality of primary account numbers (PANs) each mapped to a key of the payment card, wherein the payment card is operable with a transaction device to effect a financial transaction, and further wherein operation of a key generates a one-time passcode (OTP) specific to the PAN mapped to the key;
   wherein the mobile application is further operable to indicate to the wallet server the one-time passcode (OTP) generated by the payment card to provide a second level of security; and
   wherein the transaction is effected using the selected and pre-authorized payment scheme and conforms to payment card standards, providing the transaction is finalized within the pre-authorization window duration and using the one-time passcode (OTP) generated by the payment card.

2. The system according to claim 1, wherein the operation of the payment card to effect the financial transaction involves interaction of the payment card with a magnetic stripe reader of the transaction device, the magnetic stripe reader reading from the payment card a primary account number.

3. The system according to claim 1, wherein the transaction device communicates a primary account number to the wallet server, and the wallet server is configured to assess if a user wallet account corresponding to the communicated primary account number has a pre-authorized payment scheme recorded in association therewith.

4. The system according to claim 1, wherein the wallet server is further configured to initiate a payment request with the indicated payment scheme if it is assessed that a pre-authorized payment scheme is recorded in association with the user wallet account, and the pre-authorization window duration is active.

5. The system according to claim 1, wherein the mobile application is further configured to request a pass code for a payment scheme, and to transmit the pass code to the wallet server during the process of indicating to the wallet server which of the one or more payment schemes is to be pre-authorized for a transaction.

6. The system according to claim 5, wherein the wallet server is further configured to generate a OTP specific to the payment scheme indicated thereto by the mobile application, and to compare the generated OTP with the OTP generated and received from the payment card.

7. The system according to claim 1, wherein the mobile application is further configured to indicate to the wallet server a spend limit, and the wallet server is further configured to assess if the spend limit has been exceeded, or will be exceeded by the financial transaction to be effected.

8. An electronic payment method, the method comprising:
   selecting on a mobile application a payment scheme with which to effect a financial transaction;
   communicating the selected payment scheme and a pre-authorization window duration from the mobile application to a wallet server to provide a first level of security;
   interacting a payment card with a transaction device;
   communicating a primary account number (PAN) of the payment card to the wallet server; and the wallet sever to assess if the pre-authorization window duration is active,
   conducting a financial transaction using the payment scheme selected by the mobile application,
   wherein the payment card comprises a plurality of keys, and the payment card is issued with a plurality of primary account numbers (PANs) each mapped to a key of the payment card, and
   the method further comprises generating a one-time passcode (OTP) specific to the PAN mapped to a key when the key is operated, and indicating the generated one-time passcode (OTP) to the wallet sever by the mobile application to provide a second level of security,
   wherein the transaction is effected using the selected and pre-authorized payment scheme and conforms to payment card standards, providing the transaction is finalized within the pre-authorization window duration and using the one-time passcode (OTP) generated by the payment card.

9. The method according to claim 8, wherein interacting the payment card with the transaction device involves swiping a magnetic stripe of the payment card into a magnetic stripe reader of the transaction device, thereby a primary account number of the payment card is communicated to the transaction device.

10. The method according to claim 8, further comprising the transaction device communicating a primary account number to the wallet server, and the wallet server assessing if a user wallet account corresponding to the communicated primary account number has a pre-authorized payment scheme recorded in association therewith.

11. The method according to claim 8, further comprising the wallet server initiating a payment request with the indicated payment scheme if it is assessed that a pre-authorized payment scheme is recorded in association with the user wallet account, and the pre-authorization window duration is active.

12. The method according to claim 11, further comprising the mobile application requesting a pass code for a payment scheme, and transmitting the pass code to the wallet server during a process of indicating to the wallet server which of the one or more payment schemes is to be pre-authorized for a transaction.

13. The method according to claim 12, further comprising the wallet server generating a OTP specific to the payment scheme indicated thereto by the mobile application, and comparing the generated OTP with the OTP generated and received from the payment card.

14. The method according to claim 8, further comprising the mobile application indicating to the wallet server a spend limit, and the wallet server assessing if the spend limit has been exceeded, or will be exceeded by the financial transaction to be effected.

\* \* \* \* \*